United States Patent [19]
Wylot et al.

[11] B  3,914,129
[45] Oct. 21, 1975

[54] HIGH INDEX OPTICAL GLASS
[75] Inventors: James Matthew Wylot; Edgar Joseph Greco, both of Rochester, N.Y.
[73] Assignee: Eastman Kodak Company, Rochester, N.Y.
[22] Filed: Sept. 5, 1972
[21] Appl. No.: 286,499
[44] Published under the Trial Voluntary Protest Program on January 28, 1975 as document no. B 286,499.

[52] U.S. Cl. .............................. 106/47 Q; 106/53
[51] Int. Cl.² .................................... C03C 3/12
[58] Field of Search .................. 106/47 Q, 47 R, 53

[56] References Cited
UNITED STATES PATENTS
1,607,817  11/1926  Dennis .............................. 106/47 R
2,673,809  3/1954  Weissenberg et al. ............. 106/47 R FOREIGN PATENTS OR APPLICATIONS
736,073  8/1955  United Kingdom ............... 106/47 Q OTHER PUBLICATIONS
Dennis et al., "Germanium Glasses," J. Soc. Glass Tech. 9, p. 184, (1925).

Primary Examiner—Anthony Skapars
Assistant Examiner—Thomas A. Waltz
Attorney, Agent, or Firm—R. F. Brothers

[57]  ABSTRACT

An optical glass having a high index of refraction, high dispersion and low absorption in the visible region of the spectrum produced from melts comprising lead oxide (PbO), tellurium dioxide ($TeO_2$), germanium dioxide ($GeO_2$), sodium oxide ($Na_2O$) and silicon dioxide ($SiO_2$).

1 Claim, No Drawings

HIGH INDEX OPTICAL GLASS

CROSS REFERENCE TO RELATED APPLICATIONS

Reference is made to commonly assigned copending U.S. Pat. application Ser. No. 286,498, filed Sept. 5, 1972, in the names of Edgar Joseph Greco and James Matthew Wylot.

BACKGROUND OF THE INVENTION

1. Field of the Invention

This invention relates to optical glasses and in particular to optical glasses having a high index of refraction, high dispersion and low absorption in the visible region of the spectrum.

2. Description of the Prior Art

It is well known in the glass and lens making arts that optical glasses having high indices of refraction, high dispersion and low absorption in the visible region of the spectrum would be of great utility in photographic systems. A high index of refraction permits reduction of the curvature required in a lens element to produce a desired optical performance, thereby making lens production simpler and less expensive and permitting production of otherwise impractical lenses. Low absorption in the visible region of the spectrum, i.e., low color, is desirable in a photographic lens since it permits satisfactory exposure with lower ambient illumination and because distortion of scene color by the lens system is minimized. High dispersion permits greater correction of chromatic aberrations, thereby permitting design and manufacture of lens systems which would otherwise be unusable in photographic apparatus.

Flint glasses which are characterized by a high index of refraction have long been known and studied by glass technologists. However, such high index flint glasses have been characterized by a yellow color which makes them unsatisfactory for use in photographic apparatus. Recent developments in lead-tellurium flint glasses have resulted in optical glasses which are characterized by a high index of refraction as well as low absorption in the visible region of the spectrum. Specific examples of these glasses are disclosed in the referenced related patent application, U.S. Ser. No. 286,498, filed Sept. 5, 1972, in the names of Greco and Wylot.

The addition of certain alkali oxides, in particular sodium oxide ($Na_2O$), to flint glasses is known to usually increase the dispersion of the glass, i.e., decrease the Abbe number. However, alkali containing flint glasses generally exhibit increased color as well as decreased chemical durability, both undesirable qualities in glasses for use in photographic apparatus. We have discovered that the dispersion of some of the flint glasses disclosed in the referenced related patent application may be increased by the addition of sodium oxide ($Na_2O$) without a significant increase in color or decrease in chemical durability. In particular, we have discovered that up to 10 percent by weight of $Na_2O$ may be added to glasses in the lead oxide-tellurium oxide-germanium oxide system without significant color increase, while up to 7 percent by weight of $Na_2O$ may be added without a significant decrease in chemical durability.

SUMMARY OF THE INVENTION

Accordingly, it is an object of the present invention to provide an optical glass having high dispersion.

Another object is to provide such an optical glass which is durable.

Another object is to provide such an optical glass having a high index of refraction.

Still another object is to provide such an optical glass having low absorption in the visible region of the spectrum.

It has been found that these and other objects are accomplished according to the present invention by the addition of sodium oxide ($Na_2O$) to certain flint glasses, to provide optical glass consisting of components having the following weight percents:

| Component | Weight (Percent) |
|---|---|
| Lead oxide (PbO) | 64.7 |
| Tellurium dioxide ($TeO_2$) | 9.7 |
| Germanium dioxide ($GeO_2$) | 7.6 |
| Sodium oxide ($Na_2O$) | 5 |
| Silicon dioxide ($SiO_2$) | 13 |

DETAILED DESCRIPTION OF THE PREFERRED EMBODIMENTS OF THE INVENTION

The present invention provides optical glasses which are extremely well suited for lens systems of the type used in photographic apparatus. By way of example, optical glasses according to this invention have been produced from melts having the composition by weight percent listed in the following tables. Table I illustrates examples of glass compositions in which sodium oxide ($Na_2O$) has been added to the basic tellurium-lead-germanium system. These glasses were fired in gold crucibles at temperatures in the range from 800°–950° C.

TABLE I

| No. | PbO | $TeO_2$ | $GeO_2$ | $Na_2O$ | $n_D$ | $V_D$ |
|---|---|---|---|---|---|---|
| 135D | 57.7 | 9.7 | 27.6 | 5 | 1.962 | 18.2 |
| 135E | 62.7 | 9.7 | 22.6 | 5 | 2.001 | 16.72 |
| 135H | 57.0 | 8.8 | 25.1 | 9.1 | 1.920 | 17.5 |
| 135L | 56.0 | 8.6 | 24.7 | 10.7 | | |
| 135O | 67.7 | 9.7 | 12.6 | 10 | | |
| 135Q | 59.7 | 9.2 | 26.3 | 4.8 | 1.977 | 17.8 |

Each of these glasses is characterized by high dispersion, all having an Abbe number lying between 16.0 and 22.0, due apparently to the addition of sodium oxide ($Na_2O$) to the melts. In addition, these glasses are characterized by high indices of refraction, all having an index in excess of 1.90. Moreover, all of these glass exhibit low absorption of light in the visible region of the spectrum. Finally, no measurable deterioration of chemical durability has been observed in those glasses in which the amount of sodium oxide ($Na_2O$) is limited to 7 percent or less by weight.

It has been found that up to 18 percent silicon dioxide ($SiO_2$) may be substituted for germanium dioxide ($GeO_2$) in these glasses, thereby resulting in a less expensive glass composition. However, increasing the amount of silicon dioxide above 18 percent results in increased color and decreased durability. Accordingly, Table II illustrates examples of glass compositions in which silicon dioxide has been added to the system in partial substitution for germanium dioxide ($GeO_2$).

These glasses were fired in gold crucibles at a temperature in the range of 800°–950° C.

TABLE II

| No. | PbO | TeO$_2$ | GeO$_2$ | Na$_2$O | SiO$_2$ | n$_D$ | V$_D$ |
|---|---|---|---|---|---|---|---|
| 135g | 62.7 | 9.7 | 17.6 | 5 | 5 | 1.961 | 17.85 |
| 135I | 62.7 | 9.7 | 7.6 | 5 | 15 | 1.884 | 20.6 |
| 135K | 62.7 | 12.7 | 7.6 | 5 | 12 | 1.90 | |
| 135M | 62.7 | 15.7 | 7.6 | 5 | 9 | 1.959 | 18.04 |
| 135N | 68.7 | 9.7 | 7.6 | 5 | 9 | 1.968 | 17.24 |
| 135V | 62.7 | 9.7 | 12.6 | 5 | 10 | 1.919 | 19.5 |
| 135I-1 | 64.7 | 7.7 | 7.6 | 5 | 15 | 1.891 | 20.32 |
| 134I-2 | 64.7 | 7.7 | 5.6 | 7 | 15 | 1.86 | |
| 135I-3 | 64.7 | 7.7 | 7.6 | 7 | 13 | 1.894 | 19.22 |
| 135I-4 | 59.7 | 9.2 | 21.3 | 4.8 | 5 | 1.942 | 19.30 |
| 135I-5 | 66.7 | 7.7 | 7.6 | 7 | 11 | 1.918 | 18.08 |
| 135I-6 | 64.7 | 9.7 | 7.6 | 7 | 11 | 1.919 | 18.7 |
| 135I-7 | 66.7 | 7.7 | 5.6 | 7 | 13 | 1.89 | |
| 135I-8 | 64.7 | 9.7 | 5.6 | 7 | 13 | 1.898 | 19.34 |
| 135I-9 | 62.7 | 11.7 | 5.6 | 7 | 13 | 1.88 | |
| 135I-10 | 62.7 | 11.7 | 7.6 | 7 | 11 | 1.89 | |
| 135I-11 | 64.7 | 9.7 | 7.6 | 5 | 13 | 1.912 | 19.6 |
| 135I-11A | 61.6 | 9.2 | 6.8 | 5.2 | 17.2 | 1.863 | 21.6 |
| 135I-12 | 64.7 | 9.7 | 5.6 | 5 | 15 | 1.88 | |

Each of these glasses is also characterized by high dispersion, all having an Abbe number between 17 and 22. In addition, all have an index of refraction in excess of 1.80 and all exhibit low absorption of light in the visible region of the spectrum. Moreover, no measurable deterioration of chemical durability has been observed in those glasses in which the amount of sodium oxide (Na$_2$O) is limited to 7 percent or less by weight.

By way of specific example of an optical glass produced according to this invention, a sample of melt 135I-11A as illustrated in Table II was prepared from the following components:

| Component | Weight (gms) |
|---|---|
| PbO | 1294 |
| TeO$_2$ | 193 |
| GeO$_2$ | 142 |
| SiO$_2$ | 360 |
| Na$_2$CO$_3$ | 188 |

The TeO$_2$ and Na$_2$CO$_3$ were placed in a twin-shell blender and blended for a period of thirty minutes, as were the PbO, GeO$_2$ and SiO$_2$. The former mixture was then placed in a gold crucible and fired at a temperature of 900° C for 1 hour. The remaining mixture of PbO, GeO$_2$ and SiO$_2$ was then added to the crucible and firing was continued for an additional 40 minutes at 900° C. Stirring was then begun with a three-bladed, three-tiered gold stirrer at 200 rpm. Stirring was continued for 10 minutes at a temperature of 900° C. Stirring was then halted for 30 minutes and then stirring was again commenced and continued for 15 minutes at 900° C. The melt temperature was then reduced to 800° C and stirring was continued for 30 minutes. The melt was then cast onto a cast iron table whose temperature was maintained at 150° C and the glass was subsequently annealed at a temperature of 290° C. The resultant glass as illustrated in Table II has an index of refraction of 1.863 and an Abbe number of 21.60 and the following composition:

| Component | Weight (Percent) |
|---|---|
| PbO | 61.6 |
| TeO$_2$ | 9.2 |
| GeO$_2$ | 6.8 |
| SiO$_2$ | 17.2 |
| Na$_2$O | 5.2 |

This invention has been described in detail with particular reference to the preferred embodiments thereof, but it will be understood that variations and modifications can be effected within the spirit and scope of the invention.

We claim:

1. Optical glass having an index of refraction of approximately 1.912 and an Abbe number of approximately 19.6 and consisting of components having the following weight percents:

| Component | Weight Percent |
|---|---|
| Lead Oxide (PbO) | 64.7 |
| Tellurium dioxide (TeO$_2$) | 9.7 |
| Germanium dioxide (GeO$_2$) | 7.6 |
| Sodium Oxide (Na$_2$O) | 5 |
| Silicon dioxide (SiO$_2$) | 13 |

* * * * *